United States Patent

Shuey et al.

[11] Patent Number: 5,923,269
[45] Date of Patent: Jul. 13, 1999

[54] ENERGY METER WITH MULTIPLE PROTOCOLS FOR COMMUNICATION WITH LOCAL AND WIDE AREA NETWORKS

[75] Inventors: Kenneth C. Shuey; Robert T. Mason, Jr.; Arnold W. Bragg; David C. Lawrence, all of Raleigh, N.C.

[73] Assignee: ABB Power T&D Company Inc., Raleigh, N.C.

[21] Appl. No.: 08/908,728

[22] Filed: Aug. 7, 1997

Related U.S. Application Data

[63] Continuation of application No. 08/870,751, Jun. 6, 1997, abandoned.

[51] Int. Cl.$^6$ .................................................. G09B 23/00
[52] U.S. Cl. ............................. 340/870.02; 340/870.03; 340/870.07; 370/338
[58] Field of Search ..................... 340/870.02, 870.03, 340/870.01, 870.11, 825.06, 286.02, 870.07; 364/492, 132; 307/39, 29; 379/107, 106; 370/338

[56] References Cited

U.S. PATENT DOCUMENTS

| | | | |
|---|---|---|---|
| 3,973,240 | 8/1976 | Fong | 340/151 |
| 4,056,107 | 11/1977 | Todd et al. | 130/27 R |
| 4,190,800 | 2/1980 | Kelly, Jr. et al. | 325/37 |
| 4,250,489 | 2/1981 | Dudash et al. | 340/147 T |
| 4,321,582 | 3/1982 | Banghart | 340/310 R |
| 4,617,566 | 10/1986 | Diamond | 340/870.11 |
| 4,638,298 | 1/1987 | Spiro | 340/827 |
| 4,692,761 | 9/1987 | Robinton | 340/825.01 |
| 4,724,435 | 2/1988 | Moses et al. | 340/870.13 |
| 4,792,946 | 12/1988 | Mayo | 370/338 |
| 4,884,021 | 11/1989 | Hammond et al. | 324/142 |
| 5,032,833 | 7/1991 | Laporte | 340/825.02 |
| 5,053,766 | 10/1991 | Ruiz-del-Portal et al. | 340/870.02 |
| 5,056,107 | 10/1991 | Johnson et al. | 375/1 |
| 5,086,385 | 2/1992 | Launey | 364/188 |
| 5,179,376 | 1/1993 | Pomatto | 340/870.02 |
| 5,197,095 | 3/1993 | Bonnet | 379/107 |
| 5,345,225 | 9/1994 | Davis | 340/635 |
| 5,406,495 | 4/1995 | Hill | 364/483 |
| 5,438,329 | 8/1995 | Gastouniotis et al. | 340/870.02 |
| 5,473,322 | 12/1995 | Carney | 340/870.02 |
| 5,495,239 | 2/1996 | Ouellette | 340/870.02 |
| 5,528,507 | 6/1996 | McNamera | 364/483 |
| 5,544,036 | 8/1996 | Brown, Jr. et al. | 364/145 |
| 5,572,438 | 11/1996 | Ehlers et al. | 364/492 |
| 5,574,657 | 11/1996 | Tofte | 364/510 |
| 5,621,629 | 4/1997 | Hemminger et al. | 363/56 |

FOREIGN PATENT DOCUMENTS

| | | |
|---|---|---|
| 0395495 A1 | 10/1990 | European Pat. Off. . |
| 069098 A2 | 12/1994 | European Pat. Off. . |
| 59-229949 | 12/1984 | Japan . |
| 5-260569 | 10/1993 | Japan . |
| 02222898 | 3/1990 | United Kingdom . |

*Primary Examiner*—Michael Horabik
*Assistant Examiner*—Albert K. Wong
*Attorney, Agent, or Firm*—Woodcock Washburn Kurtz Mackiewicz & Norris LLP

[57] ABSTRACT

A solid state electrical meter incorporates the ability to support two-way radio, dialback telephone and CEBus personal LAN. These three communications media require different protocols to meet their respective requirements. Embedding multiple protocols within the meter controller makes the device extremely flexible for current and future applications.

33 Claims, 4 Drawing Sheets

PASS THROUGH PROTOCOL

ENERGY METER WITH MULTIPLE PROTOCOLS FOR COMMUNICATION WITH LOCAL AND WIDE AREA NETWORKS

CROSS REFERENCE(S)

This is a continuation application of Ser. No. 08/870,751, filed Jun. 6, 1997 now abandoned. The subject matter disclosed herein is related to the subject matter of copending application Ser. No. 08/870,640, filed Jun. 6, 1997, titled "RF Repeater For Automatic Meter Reading System", the disclosure of which is incorporated by reference herein.

FIELD OF THE INVENTION

The present invention relates generally to a utility meter, and more particularly to a utility meter that is capable of serving as a communications interface between an automatic meter reading (AMR) network and a local area network (LAN).

BACKGROUND OF THE INVENTION

The reading of electrical energy has historically been accomplished with human meter readers that came on-site to the customers' premises and manually documented the readings. The information extracted from the meters was simple pulse initiator information of basic quantities. (A pulse initiator (PI) is an optical device that picks up the rotations of a disc on an electromechanical meter. The disc rotations, which are proportional to energy use, are converted by the PI into pulses that can be read by computing devices.) Over time, manual meter reading has been enhanced with walk-by or drive-by reading systems that utilize radio communications between the meters and a meter reading device. The information that these walkby and driveby systems collected increased, but still the functions provided by the communication systems were limited. More recently, over the last few years, there has been a concerted effort to accomplish meter reading by installing fixed networks that would allow data to flow from the meter to a host computer system without human intervention.

The fixed RF communications that have been deployed have been primarily for basic meter reading. Some enhancements to the systems have permitted functions such as time of use (TOU) and load survey to be incorporated.

Other functions are being performed with RF communications but they are typically standalone systems, separate from metering systems. One of the primary reasons these systems are not integrated is a lack of a single device that incorporates the protocols necessary to adapt the systems into a manageable unit that will work with a system infrastructure that is cost effective for simple AMR.

One example of an integrated system is the TranstexT system, which incorporates metering into a home automation environment. (Systems of this type are described in U.S. Pat. Nos. 5,572,438, Nov. 5, 1996, "Energy Management and Building Automation System"; and U.S. Pat. No. 5,544,036, Aug. 6, 1996, "Energy Management and Home Automation System.") This system provides higher function capabilities for elements of TOU, real-time pricing and load management, but the basic infrastructure is not cost effective for AMR. Other systems that utilize broadband technologies such as cable to get to the home are also able to offer advanced services but are too expensive to be advantageous for AMR. Further background information regarding AMR (also called network meter reading, or NMR) can be found in U.S. Pat. No. 4,056,107, Feb. 15, 1990, "Radio Communication Network For Remote Data Generating Stations." Further information regarding the use of a meter in a CEBus network may be found in U.S. Patent Application Serial No. __, filed Mar. 31, 1997, "Communications Module Based Repeater" (attorney docket ABME-0213).

SUMMARY OF THE INVENTION

The present invention provides a utility (e.g., electric, gas or water) meter that includes a radio frequency (RF) transceiver, a telephone modem, a local area network (LAN) transceiver, a controller, and metering means. The inventive meter functions as a communications interface between an AMR network and the LAN.

In a presently preferred embodiment of the invention, the LAN is a CEBus network and the LAN transceiver is a UART (universal asynchronous receiver transmitter). (The UART is preferably shared with an infrared transceiver, for local maintenance purposes, and telephone modem. The meter micro-multiplexes the UART such that the LAN is supported along with the other communication means.) Moreover, in the preferred embodiment, the control processor communicates with the AMR network via the modem and/or the RF transceiver, as necessary, and communicates with the LAN via the LAN transceiver. Further, the RF transceiver is operative to transmit and receive signals in an unlicensed frequency band of about 902–928 MHz. Other features of the present invention are described below.

DETAILED DESCRIPTION OF PREFERRED EMBODIMENTS

Figure 1:
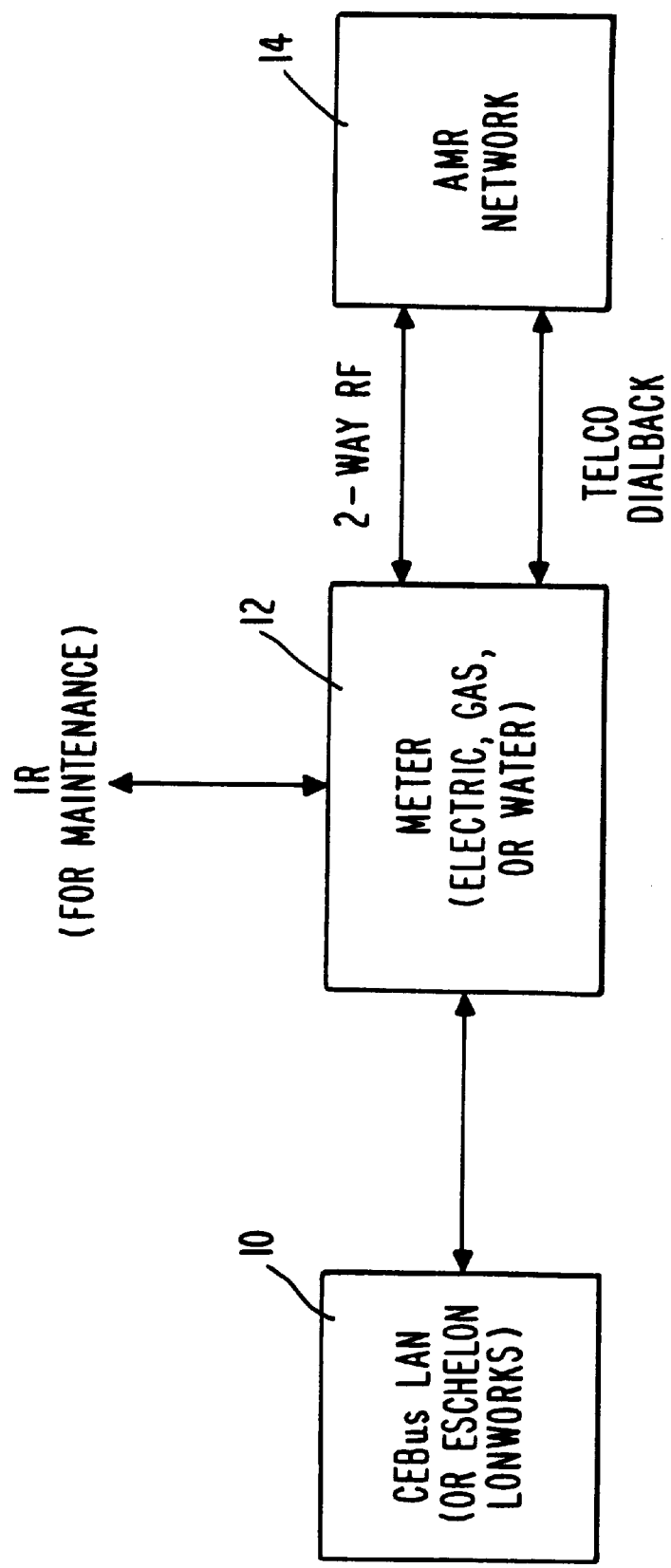
FIG. 1 is a simplified block diagram of an AMR system in accordance with the present invention.

To make an AMR system adaptive to higher functions, the present invention incorporates a variety of communication protocols into a solid state meter. As shown in FIG. 1, the system includes a CEBus LAN 10, an electronic meter 12 (actually a plurality of such meters and LANs), and a fixed AMR network 14. The meter 12 utilizes a two-way RF protocol, for communicating with the AMR network 14, that allows very cost effective meter reading to take place. The meter also incorporates a protocol for dialback telephone for locations within a large metering system where RF communication is not the optimal selection.

In addition to these AMR protocols, the meter 12 includes support for CEBus communications. This protocol allows the meter to be manufactured without an internal display and still communicate with a display within the house if that is a requirement. In addition, the CEBus protocol allows access to home automation in situations where that is warranted. If home automation is not needed but security is, the meter 12 can use the CEBus protocol for access into the security system. In all cases, the two-way RF system can be utilized for read/write data required for the system (with all messages ported through the meter).

The basic requirement for all the various systems mentioned above is a robust two-way RF protocol that links the meter with a host computer (not shown in FIG. 1) of the AMR network 14. This protocol must have the capability to pass messages through the meter 12 into the CEBus network 10. This pass through signaling permits rate management for electricity (in an electric meter application), message displays for customer alerts, demand side management deployment and other activities. The protocol preferably also has the capacity to allow the meter to report by exception for events such as security related activities and outage reporting. This capability within the RF protocol for advanced functions is included without burdening the basic capability of the meter to accomplish simple AMR in a very cost effective manner.

The CEBus protocol (this embodiment) provides a link to a remote residential display for simple AMR as well as higher functions. In addition to the display capability, CEBus provides a peer-to-peer communication capability which allows the meter to pass through information to any other device that is on the CEBus LAN 10. This effectively allows the meter to be the gateway into the residential system for all levels of communication requirements.

Figure 2:
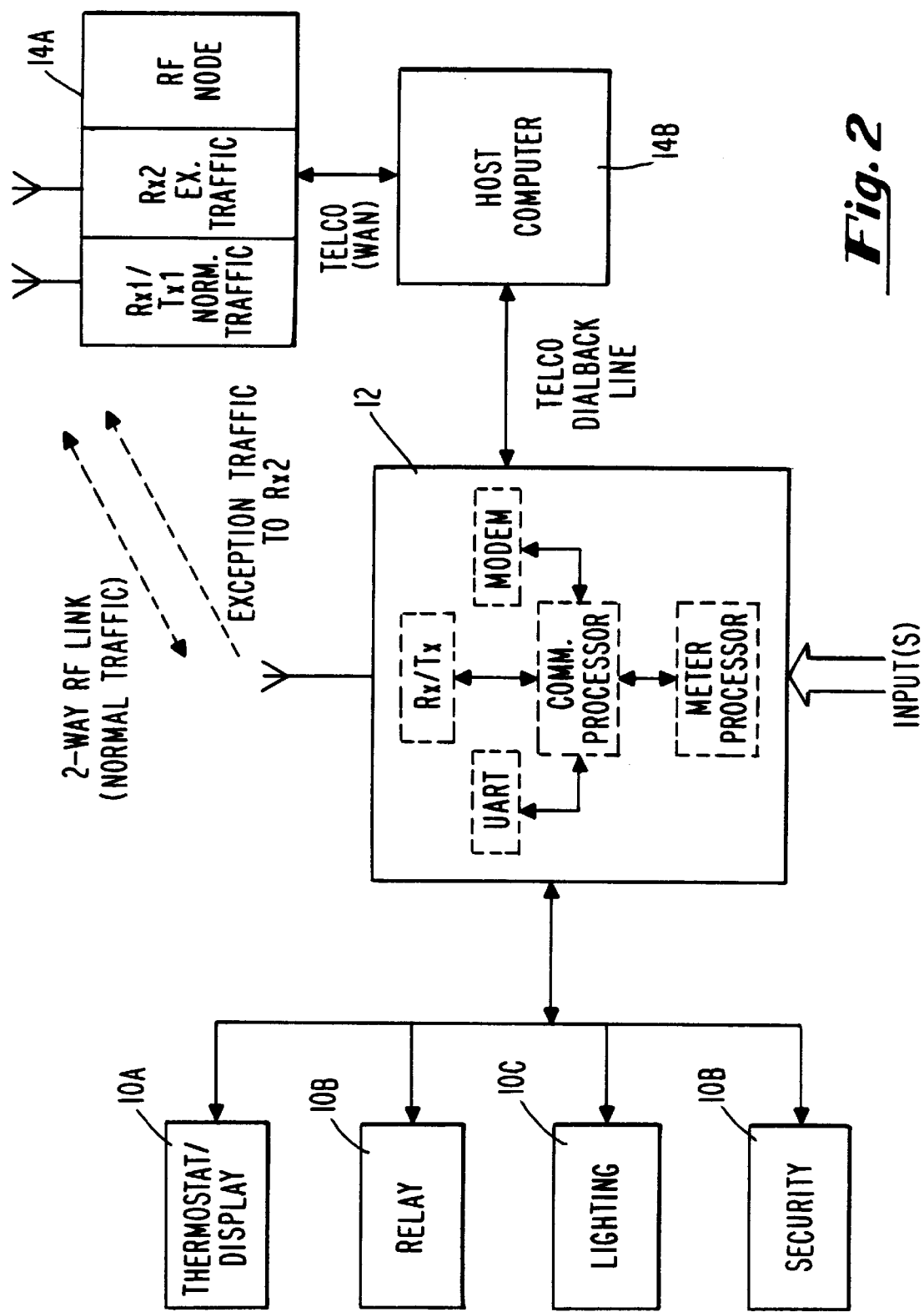
FIG. 2 is a more detailed block diagram of an AMR system in accordance with the present invention.

FIG. 2 provides a more detailed illustration of the preferred embodiment of the invention. As shown, the CEBus LAN 10 includes a thermostat/display device 10A that can be used by the meter 12 to display information to the customer (via CEBus communications). In addition, the LAN 10 may include relay 10B, lighting 10C and security 10D subsystems that may be controlled through the CEBus protocol.

The meter includes an RF transceiver for communicating normal and exception AMR traffic to the AMR network 14. The meter also includes a modem for so called dialback telephone communications with the AMR network, a UART transceiver, or the like, for communicating with the CEBus LAN 10 (and IR port and telephone), and a meter processor for controlling the metering functions as required for a given application. (Such meter functions are described, e.g., in U.S. Pat. No. 5,621,629, Apr. 15, 1997, titled "Switching Power Supply For Use In An Electronic Meter Having Wide Range Of Input Voltages.")

The AMR network 14, in the embodiment of FIG. 2, includes an RF node 14A (actually a plurality of such nodes) and a host computer, or server, 14B (or multiple hosts, as needed). The node 14A includes a transceiver for normal traffic and a receiver for exception traffic, as discussed above. The plurality of RF nodes and host computer(s) constitute a wide area network (WAN).

Figure 3:
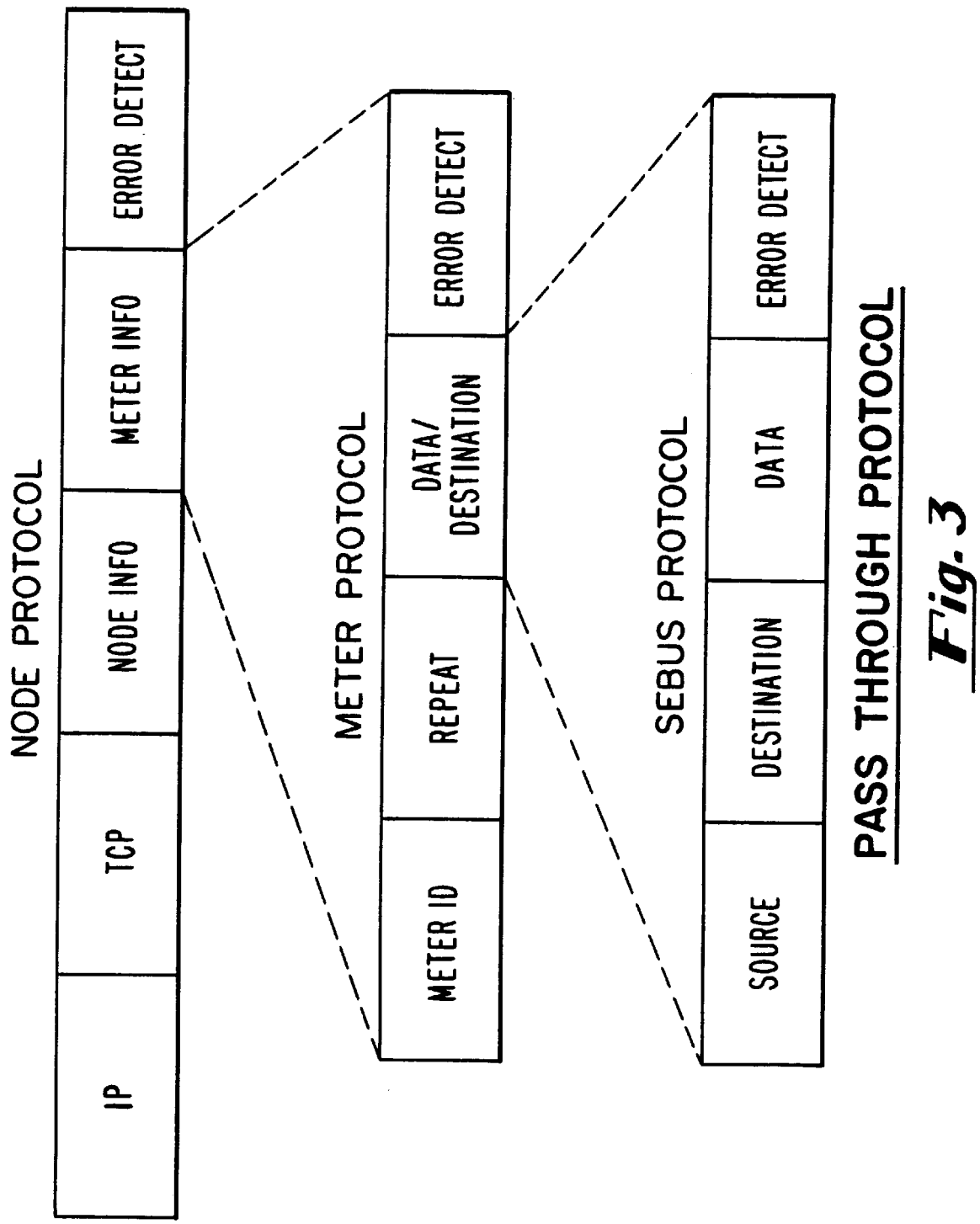
FIG. 3 schematically illustrates a pass through protocol in accordance with the present invention.

Referring now to FIG. 3, a pass through protocol useful in connection with the present invention includes a CEBus protocol embedded in a meter protocol, which in turn is embedded in a node protocol. Meter information in a node protocol packet includes meter ID, a repeat count, data and destination address, and error detection bits. The data/destination bits of the meter protocol are passed through to the CEBus network and include source and destination addresses, data, and error detection bits.

In presently preferred embodiments of the invention, the pass through protocols for the system are tabled based. The tables are designed to allow data, functions, commands, schedules, etc., to be passed to the different system elements. For example, the host can send table information to the node that will cause a group of meters to be read. The node can send table information to the meter that will cause a CEBus communication to take place. In addition, the normal meter reading information is passed in table format from the meter to the node.

Figure 4:
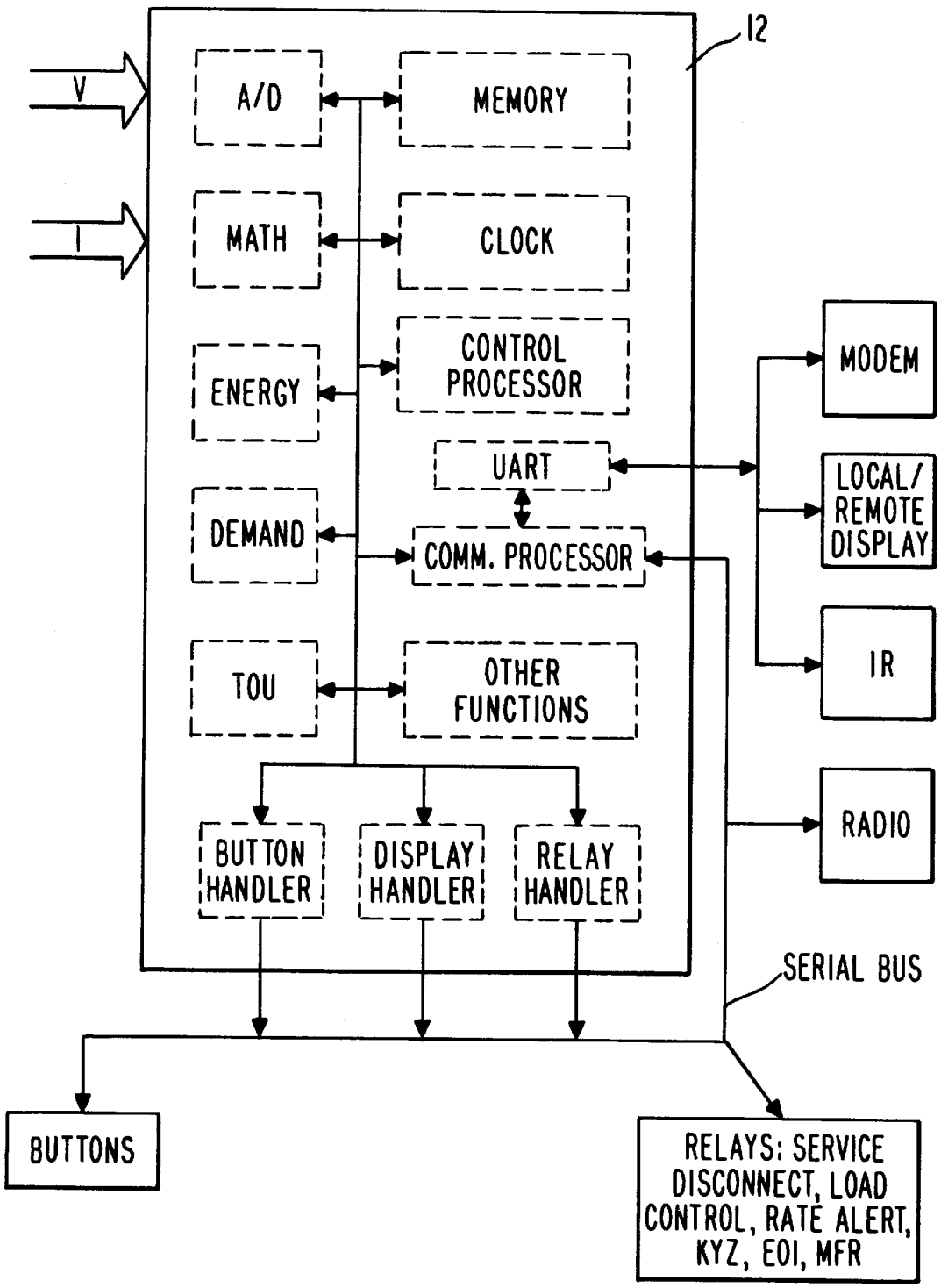
FIG. 4 is a block diagram of a solid state electric meter in accordance with the present invention.

FIG. 4 is a more detailed block diagram of a presently preferred embodiment of a solid state electronic meter 12 in accordance with the present invention. As shown, the meter 12 includes a control processor; communications processor; clock; memory; analog-to-digital (A/D) convertor (for digitizing input voltage and current measurements); math coprocessor; energy, demand and time of use processors; and button, display and relay handlers. The various processor functions may be implemented with one or more microprocessors or digital signal processors controlled by various firmware or software modules, and the button, display and relay handlers may be implemented with combinations of hard wired circuitry and/or software or firmware. A serial bus is employed for communications between the meter 12 and radio (RF transceiver), modem, IR transceiver, relays, display and control buttons (where the relay, display and buttons may be part of the CEBus LAN 10 (FIG. 2).

In sum, the presently preferred embodiments of the invention provide the following features:

1. A solid state meter with multiple protocols to allow use in simple AMR systems as well as full function home automation systems.
2. A solid state meter without an internal display that has an optional capability to drive a display within the residence.
3. A solid state meter that supports outage detection and security with report by exception.
4. A solid state meter with pass-through data capability into a CEBus peer-to-peer architecture.
5. A solid state meter with dialback phone protocol support for simple AMR and the capability to support an external display option.
6. A solid state meter with RF two-way protocol support for simple AMR and the capability to support an external display option.
7. A solid state meter with the capability to take information from the CEBus LAN and pass it upstream to RF nodes or phone servers.

While the present invention has been described and illustrated with reference to specific, presently preferred embodiments, those skilled in the art will recognize that modifications and variations may be made without departing from the principles of the invention as described above and set forth in the following claims. For example, except as they may be explicitly so limited, the claims are not restricted to embodiments of the invention in which the metering device measures electrical energy or power, since the invention is also applicable to water and gas meters. The claims may also cover a meter which is not specifically utilized in connection with a CEBus LAN (although the invention is particularly useful in such an application). Other features of the presently preferred embodiments described above may be modified without substantially departing from the teachings set forth herein.

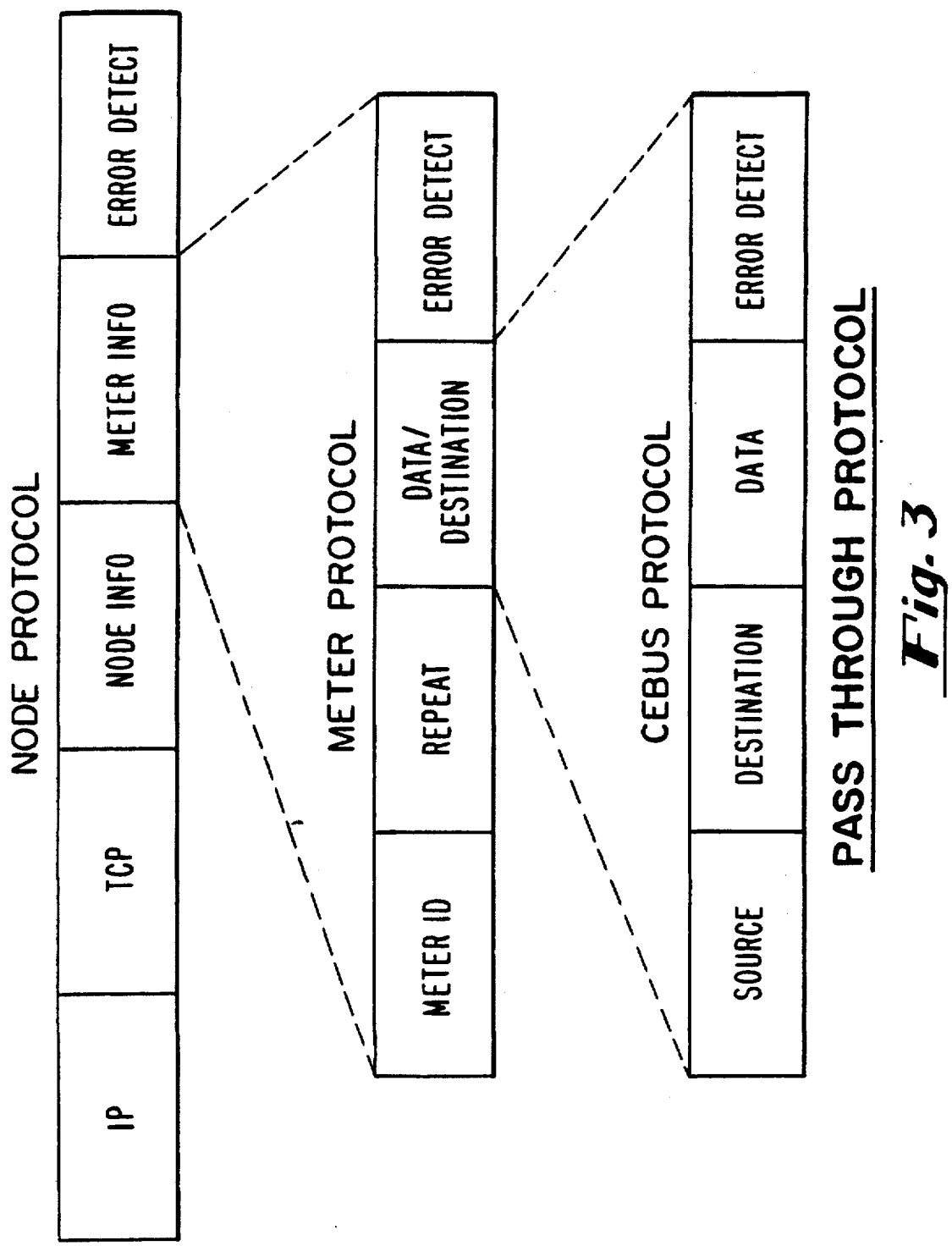

We claim:

1. A utility meter, said utility meter communicatively coupled to an automatic meter reading (AMR) network and a local area network (LAN), said utility meter comprising:
   (a) a radio frequency (RF) transceiver;
   (b) a telephone modem;
   (c) a LAN transceiver;
   (d) a controller operatively coupled to said RF transceiver, modem and LAN transceiver;
   (e) metering means operatively coupled to said controller; and
   (f) a plurality of communications protocols for facilitating communications between said AMR network, LAN and utility meter;

whereby said utility meter is operable to function as a communications interface between said AMR network and said LAN.

2. A utility meter as recited in claim 1, wherein said LAN is a CEBus network.

3. A utility meter as recited in claim 1, wherein said LAN transceiver is a UART.

4. A utility meter as recited in claim 1, wherein said metering means comprises an electrical energy meter.

5. A utility meter as recited in claim 1, wherein said metering means comprises a gas meter.

6. A utility meter as recited in claim 1, wherein said metering means comprises a water meter.

7. A utility meter as recited in claim 1, wherein said RF transceiver is operative to transmit and receive signals in a frequency band of about 902–928 MHz.

8. A utility meter as recited in claim 1, wherein said controller is operative to communicate with said AMR network via said modem and/or said RF transceiver.

9. A utility meter as recited in claim 1, wherein said controller is operative to communicate with said LAN via said LAN transceiver.

10. A utility meter as recited in claim 1, wherein said LAN is a CEBus network; said LAN transceiver comprises a UART; said metering means comprises an electrical energy meter; said RF transceiver is operative to transmit and receive signals in a frequency band of about 902–928 MHz; said controller is operative to communicate with said AMR network via said modem and/or said RF transceiver; and said controller is operative to communicate with said LAN via said LAN transceiver.

11. A utility meter, said utility meter communicatively coupled to an automatic meter reading (AMR) network and a local area network (LAN), said utility meter comprising:

(a) a radio frequency (RF) transceiver;

(b) a LAN transceiver;

(c) a controller operatively coupled to said RF transceiver and LAN transceiver;

(d) an electricity meter operatively coupled to said controller; and (e) a plurality of communications protocols for facilitating communications between said AMR network, LAN and utility meter;

whereby said utility meter is operable to function as a communications interface between said AMR network and said LAN.

12. A utility meter as recited in claim 11, wherein said LAN is a CEBus network.

13. A utility meter as recited in claim 11, wherein said LAN transceiver is a UART.

14. A utility meter as recited in claim 11, further comprising a gas meter.

15. A utility meter as recited in claim 11, further comprising a water meter.

16. A utility meter as recited in claim 11, wherein said RF transceiver is operative to transmit and receive signals in a frequency band of about 902–928 MHz.

17. A utility meter as recited in claim 11, further comprising a modem, wherein said controller is operative to communicate with said AMR network via said modem and/or said RF transceiver.

18. A utility meter as recited in claim 11, wherein said controller is operative to communicate with said LAN via said LAN transceiver.

19. A utility meter as recited in claim 11, wherein said LAN is a CEBus network; said LAN transceiver comprises a UART; said RF transceiver is operative to transmit and receive signals in a frequency band of about 902–928 MHz; and said controller is operative to communciate with said LAN via said LAN transceiver.

20. A utility meter as recited in claim 19, further comprising a modem, said controller being operative to communicate with said AMR network via said modem and/or said RF transceiver.

21. A utility meter, said utility meter communicatively coupled to an automatic meter reading (AMR) network and a local area network (LAN), said utility meter comprising:

(a) a radio frequency (RF) transceiver;

(b) a LAN transceiver;

(c) a controller operatively coupled to said RF transceiver and LAN transceiver; and (d) a plurality of communications protocols for facilitating communications between said AMR network, LAN and utility meter;

whereby said utility meter is operable to function as a communications interface between said AMR network and said LAN.

22. A utility meter as recited in claim 21, wherein said LAN is a CEBus network.

23. A utility meter as recited in claim 21, wherein said LAN transceiver is a UART.

24. A utility meter as recited in claim 21, further comprising a gas meter.

25. A utility meter as recited in claim 21, further comprising a water meter.

26. A utility meter as recited in claim 21, wherein said RF transceiver is operative to transmit and receive signals in a frequency band of about 902–928 MHz.

27. A utility meter as recited in claim 21, further comprising a modem, wherein said controller is operative to communicate with said AMR network via said modem and/or said RF transceiver.

28. A utility meter as recited in claim 21, wherein said controller is operative to communicate with said LAN via said LAN transceiver.

29. A utility meter as recited in claim 21, wherein said LAN is a CEBus network; said LAN transceiver comprises a UART; said RF transceiver is operative to transmit and receive signals in a frequency band of about 902–928 MHz; and said controller is operative to communicate with said LAN via said LAN transceiver.

30. A utility meter as recited in claim 29, further comprising a modem, said controller being operative to communicate with said AMR network via said modem and/or said RF transceiver.

31. A utility meter as recited in claim 21 wherein said plurality of communications protocols include a two-way RF protocol for facilitating communications between said AMR network and said utility meter.

32. A utility meter as recited in claim 30 wherein said plurality of communications protocols include a dialback telephone protocol for facilitating communications between said AMR network and said modem.

33. A utility meter as recited in claim 22 wherein said plurality of communications protocols include a CEBus protocol for facilitating communications between said LAN and said utility meter.

* * * * *

UNITED STATES PATENT AND TRADEMARK OFFICE
CERTIFICATE OF CORRECTION

PATENT NO. : 5,923,269
DATED : July 13, 1999
INVENTOR(S) : Kenneth C. Shuey, et al.

It is certified that error appears in the above-identified patent and that said Letters Patent is hereby corrected as shown below:

Drawing sheet, consisting of Fig. 3, should be deleted to be replaced with the drawing sheet, consisting of Fig. 3, as shown on the attached page.

Signed and Sealed this

Twenty-second Day of February, 2000

Attest:

Q. TODD DICKINSON

Attesting Officer

Commissioner of Patents and Trademarks